United States Patent
Muto et al.

(10) Patent No.: US 9,477,048 B2
(45) Date of Patent: Oct. 25, 2016

(54) SLEEVE FOR OPTICAL COMMUNICATION AND METHOD OF MANUFACTURING THE SLEEVE FOR OPTICAL COMMUNICATION

(71) Applicant: ADAMANT CO., LTD., Tokyo (JP)

(72) Inventors: Hikaru Muto, Kawaguchi (JP); Eiji Chihara, Kitamoto (JP); Seiji Nakano, Tokyo (JP); Kazuyuki Syoji, Yokote (JP)

(73) Assignee: ADAMANT CO., LTD., Tokyo (JP)

( * ) Notice: Subject to any disclaimer, the term of this patent is extended or adjusted under 35 U.S.C. 154(b) by 0 days.

(21) Appl. No.: 14/404,488

(22) PCT Filed: Jun. 5, 2013

(86) PCT No.: PCT/JP2013/003543
§ 371 (c)(1),
(2) Date: Nov. 28, 2014

(87) PCT Pub. No.: WO2013/183296
PCT Pub. Date: Dec. 12, 2013

(65) Prior Publication Data
US 2015/0226923 A1 Aug. 13, 2015

(30) Foreign Application Priority Data
Jun. 7, 2012 (JP) .................................. 2012-129677

(51) Int. Cl.
G02B 6/38 (2006.01)
G02B 6/00 (2006.01)
B28B 3/08 (2006.01)
B30B 11/00 (2006.01)
C04B 35/488 (2006.01)
(Continued)

(52) U.S. Cl.
CPC ............. G02B 6/3874 (2013.01); B28B 3/003 (2013.01); B28B 3/04 (2013.01); B28B 3/08 (2013.01);
(Continued)

(58) Field of Classification Search
CPC .. G02B 6/3874; C04B 35/4885; B28B 3/003
See application file for complete search history.

(56) References Cited

U.S. PATENT DOCUMENTS

| | | | | |
|---|---|---|---|---|
| 4,923,652 A | * | 5/1990 | Murakawa | C04B 35/638 264/344 |
| 2003/0095753 A1 | * | 5/2003 | Wada | C03C 10/00 385/78 |
| 2012/0214661 A1 | * | 8/2012 | Ito | C04B 35/486 501/134 |

FOREIGN PATENT DOCUMENTS

CN 1715244 A * 1/2006
JP H0615013 U 2/1994
(Continued)

OTHER PUBLICATIONS

Jul. 2, 2013 International Search Report issued in International Patent Application No. PCT/JP2013/003543.
Jul. 2, 2013 Written Opinion issued in International Application No. PCT/JP2013/003543.

*Primary Examiner* — Omar R Rojas
(74) *Attorney, Agent, or Firm* — Oliff PLC (57) ABSTRACT

A sleeve for optical communication and method for manufacture for the sleeve for optical communication, for which withdrawal force for ferrules, which are generally used in the technical field of optical communication, or connection loss between ferrules is a predetermined value, and for which manufacturing steps are reduced so as to allow reduction of manufacturing cost. The invention is made by press-molding ceramic feedstock, which after cold isostatic pressing and sintering are performed thereto, and is made so that an inner circumferential surface, of a through-hole for inserting a ferrule formed on the length-direction of the axis, has a sintered state.

4 Claims, 4 Drawing Sheets

(51) Int. Cl.
*B28B 3/00* (2006.01)
*B28B 3/04* (2006.01)

(52) U.S. Cl.
CPC ......... *B30B 11/001* (2013.01); *C04B 35/4885* (2013.01); *G02B 6/38* (2013.01); *G02B 6/3877* (2013.01); *C04B 2235/604* (2013.01); *C04B 2235/95* (2013.01); *C04B 2235/963* (2013.01); *G02B 6/3825* (2013.01); *G02B 6/3854* (2013.01)

(56) References Cited

FOREIGN PATENT DOCUMENTS

| JP | H0999417 A | 4/1997 |
| JP | 2001091783 A | 4/2001 |
| JP | 2004115307 A | 4/2004 |
| JP | 2005122085 A | 5/2005 |
| JP | 2011123221 A | 6/2011 |

\* cited by examiner

SLEEVE FOR OPTICAL COMMUNICATION AND METHOD OF MANUFACTURING THE SLEEVE FOR OPTICAL COMMUNICATION

TECHNICAL FIELD

The present invention relates to a sleeve for optical communication and a method of manufacturing the sleeve for optical communication.

BACKGROUND ART

An optical connector for connecting optical fibers is constituted of connecting parts which include a sleeve for an apparatus of optical communication made of ceramics such as zirconia or the like. The sleeve for optical communication is a cylindrical member having an open through-hole is configured to insert ferrules from both ends of the sleeve for optical communication so as to abut against each other inside the sleeve for optical communication. The optical fibers are respectively inserted and held in the ferrules. As the sleeve for optical communication, two types of sleeves are used, that is, one is a precision sleeve having a cylindrical shape, and the other is a split sleeve having a slit formed in a cylindrical longitudinal wall (as shown in, for example, Patent 1 to 3).

The precision sleeve and the split sleeve are respectively configured so that the inserted ferrules can be firmly held. The precision sleeve is formed so that the inner diameter is slightly larger than the outer diameter of the ferrule. Since the inner diameter of the precision sleeve is not changed by insertion of the ferrule, a highly accurate inner diameter dimension is required. On the other hand, the split sleeve is formed so that the inner diameter is slightly smaller than the outer diameter of the ferrule, and the slit is formed in an axial length direction of the split sleeve. Since the split sleeve is elastically deformed by insertion of the ferrule, the accuracy of the inner diameter dimension is not required compared with the precision sleeve.

In general, in the manufacturing of a sleeve for optical communication formed of a raw material mainly composed of zirconia, first, the raw materials containing zirconia, yttria, alumina, titania, and the like are subjected to press forming, extrusion forming, injection forming, or the like to form a cylindrical preform. Then, the cylindrical preform is fired to be hardened and, thus, to obtain a formed body. Next, treatment such as a length adjusting processing or treatment for making a length dimension in a longitudinal direction of the formed body is performed to have the length thereof equal to a predetermined length. An inner peripheral surface of the formed body is subjected to polishing processing such as honing by a diamond wheel, and such as pin grinding by diamond abrasive grains, and the like Namely, the inner diameter adjusting processing is performed so that the formed body becomes a predetermined inner diameter dimension. Next, an outer diameter adjusting processing is performed so that an outer peripheral surface of the formed body is ground with a diamond wheel using a cylindrical grinding machine or the like, so that the formed body has a predetermined outer diameter dimension. When the sleeve for optical communication is subjected to the split sleeve, a slit is formed after the length adjusting processing, the inner diameter processing, or the outer diameter processing, and the like.

In the technical field of the optical communication, regarding an optical connector, a plurality of standards are prescribed up to now. In those standards, a dimension or the like is made common for each standard to provide convenience to a user thereby. Presently, as typical optical connectors, there are the so-called SC type, FC type, MU type, and LC type optical connectors. In the outer diameter dimension and the like of the SC type optical connector, the outer diameter dimension and the like of the SC type optical connector are specified in the standard of IEC 61754-4, TIA/EIA-604-3A, and JIS C 5973. The outer diameter dimension and the like of the FC type optical connector are specified in IEC 61754-13, TIA/EIA-604-4A, and JIS C 5970. Next, the outer diameter dimension or the like of the MU type optical connector is specified in IEC 61754-6, TIA/EIA-604-17, and JIS C 5983. Further, the outer diameter dimension or the like of the LC type optical connector is specified in IEC 61754-20 and TIA/EIA-604-10A.

The inner diameters of the SC type optical connector and the FC type optical connector, and the outer diameter of a ferrule which holds the connectors thereof are respectively about 2.5 mm And the inner diameters of the MU type optical connector and of the LC type optical connector are respectively about 1.25 mm. Specifically, it is provided that the outer diameter dimensions of the SC type ferrule and the FC type ferrule which are classified into grade 1 in IEC 61754-4, IEC 61754-13, TIA/EIA-604-3A and TIA/EIA-604-4A and grade B in JIS C 5973 and 5970 are respectively specified as 2.499±0.0005 mm. Moreover, the outer diameter dimensions of the MU type ferrule and the LC type ferrule classified into grade 1 in IEC 61754-6, IEC 61754-20, TIA/EIA-604-17 and TIA/EIA-604-10A and grades B and C in JIS C 5983 are respectively specified as 1.249±0.0005 mm. In each optical connector, the outer diameter dimension of a housing is also specified by the IEC standard, the JIS standard, or the TIA/EIA standard.

CITATION LIST

Patent Literatures

Patent document 1: JP 06-15013 Y
Patent document 2: JP 2001-91783 A
Patent document 3: JP 2011-123221 A

SUMMARY OF INVENTION

Technical Problem

In each of the above-stated standards, a plug and an adapter constituting an optical connector are specified. In the adapter, pull-out force for a ferrule and connection loss occurring when the ferrules are butted against each other are specified. In particular, the JIS standard in which the SC type optical connector and the FC type optical connector are classified into the grade B in JIS C 5973 and JIS C 5970 specifies, for example, that the pull-out force for a ferrule is 2.0 to 5.9 N, and the connection loss between the ferrules butted against each other inside the adapter is not more than 0.3 dB in a physical contact connection (PC connection) using a single mode fiber. Accordingly, with regard to the sleeve for optical communication which is one of components constituting the adapter, the pull-out force for ferrules and the connection loss between the ferrules are determined in consideration of the specification of the adapter. In the sleeve for optical communication, it is required to satisfy such the conditions that the pull-out force for the ferrule is 1.5 to 6 N, and the connection loss between the ferrules is 0.3 dB in the PC connection using the single mode fiber, and the conditions are provided as standard conditions generally used in the technical field of the optical communication. However, in a conventional sleeve for the optical communication, when firing is performed, distortion or the like easily occurs, and when only firing is performed, it has been difficult to obtain a sleeve for optical communication in which the pull-out force for a ferrule and the connection loss between the ferrules satisfy the conditions and requirements in the above-stated standards. Thus, in the prior art, in order to satisfy the standard conditions, the inner peripheral surface of the sleeve for optical communication is required to be treated by adjusting processing thereof, and there is problems that the number of manufacturing processes and the manufacturing cost are increased.

In order to solve the above problem, an object of the present invention is to provide a sleeve for a device of optical communication and to provide a method of manufacturing the sleeve for optical communication, in which pull-out force for a ferrule and connection loss between ferrules meet such standard conditions generally used in the technical field of the optical communication without treatments such as an adjusting processing on an inner peripheral surface of the sleeve, and which can reduce the number of manufacturing processes or steps and manufacturing costs.

Solution to Problem

A sleeve for optical communication according to the present invention has the following summaries:
(1) a sleeve for optical communication characterizing by integrally forming a ceramics raw material by press forming, performing cold isostatic pressing, and thereafter firing, the sleeve for optical communication having: a through-hole for inserting a ferrule being formed in a cylindrical shape opened in an axial length direction, and an inner peripheral surface of the through-hole being made a fired surface appearing crystal grains of the ceramics raw material formed at the time of firing thereof;
(2) the sleeve for optical communication described in (1), wherein a plurality of crystal grains are formed on the fired surface, and a crystal grain boundary is formed between the crystal grains;
(3) a sleeve for optical communication, characterizing by: a cylindrical preform made of a ceramic raw material by press forming to form thereof; the preform being treated by cold isostatic pressing to form a formed body in uniformed forming density of a ceramics raw material; and the formed body being fired at a predetermined temperature for predetermined time, an inner peripheral surface of a through-hole thereof become altered fired surface, a crystal grain group comprised of a large number of crystal grains of the ceramics raw material being formed on the fired surface, and a crystal grain boundary being formed between the crystal grains adjacent to each other;
(4) the sleeve for optical communication described in (1) or (3), wherein surface roughness $R_a$ of the inner peripheral surface is 0.08 to 0.20 μm; and
(5) the sleeve for optical communication described in (1) or (3), wherein a tolerance of an inner diameter of the through-hole is ±2 to 10 μm.

Further, a method of manufacturing a sleeve for optical communication according to the present invention has the following summaries:
(6) a method of manufacturing a sleeve for optical communication comprising the steps of: press-forming a powder of a ceramics raw material to form a cylindrical preform having an inner peripheral surface; cold isostatic pressing the preform to form a formed body; and firing the formed body and producing the sleeve for optical communication to form crystal grains of the ceramics raw material formed at the time of firing on the inner peripheral surface;
(7) the method of manufacturing a sleeve for optical communication described in (6), wherein the preform is formed by press-forming a ceramics raw material put into a die tool, the formed body is formed by cold isostatic pressing the preform so that the forming density of the ceramics raw material become uniform, the formed body is degreased by application of heat at a predetermined temperature for a predetermined time, the degreased formed body is heated and fired at a predetermined temperature higher than the degreasing temperature, for a predetermined time, and a crystal grain group composed of a large number of crystal grains of the ceramics raw material and a crystal grain boundary formed between the crystal grains adjacent to each other are formed on a fired surface come existence on the inner peripheral surface of a through-hole;
(8) the method of manufacturing a sleeve for optical communication described in (6) or (7), wherein the fired formed body is processed to have a predetermined length;
(9) the method of manufacturing a sleeve for optical communication described in (6) or (7), wherein an outer periphery of the fired formed body is processed;
(10) the method of manufacturing a sleeve for optical communication described in (7), wherein the degreasing is performed while heating at a temperature of 400 to 500° C. for a predetermined time;
(11) the method of manufacturing a sleeve for optical communication described in (6) or (7), wherein the firing is performed while heating at a temperature of 1300 to 1500° C. for a predetermined time;
(12) the method of manufacturing a sleeve for optical communication described in (6) or (7), wherein finishing processing is performed after cooling the fired formed body.

Advantageous Effects of Invention

In a sleeve for optical communication or optical communication device according to the present invention, since an inner peripheral surface of a through-hole formed in an axial length direction is a fired surface, the sleeve for optical communication which of pull-out force for a ferrule and connection loss between the ferrules satisfy respectively the conditions and requirements in standards generally used in the technical field of optical communication, can be provided at low cost.

In a method of manufacturing a sleeve for optical communication according to the present invention, a powder of a ceramics raw material is treated to form a preform by press-forming, and the preform is conducted through compression forming by a cold isostatic pressing to form a formed body; therefore, while a manufacturing process is simplified, it is possible to obtain the sleeve for optical communication which the pull-out force for the ferrule and connection loss between the ferrules satisfy the conditions and requirements in the standards generally used in the technical field of optical communication. Accordingly, since an inner peripheral surface of the sleeve for optical communication of the present invention is not treated for adjustment thereof, the number of the manufacturing processes or steps is reduced, and consequently, the manufacturing costs are significantly reduced, and the operating efficiency can be significantly enhanced.

DESCRIPTION OF EMBODIMENTS

Figure 1A:
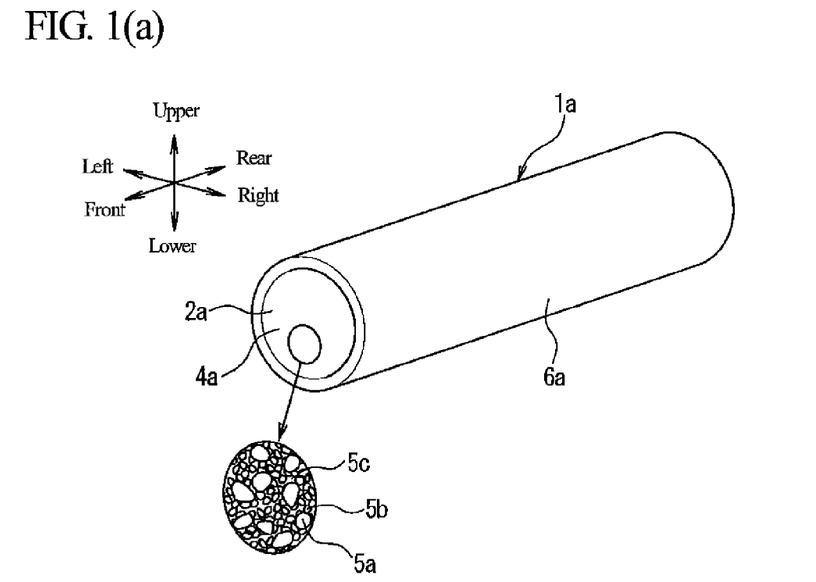
FIG. 1(a) is a perspective view of a precision sleeve for a sleeve for optical communication and a partially enlarged view showing a surface state of an inner peripheral surface of the precision sleeve of the present invention.
Figure 1B:
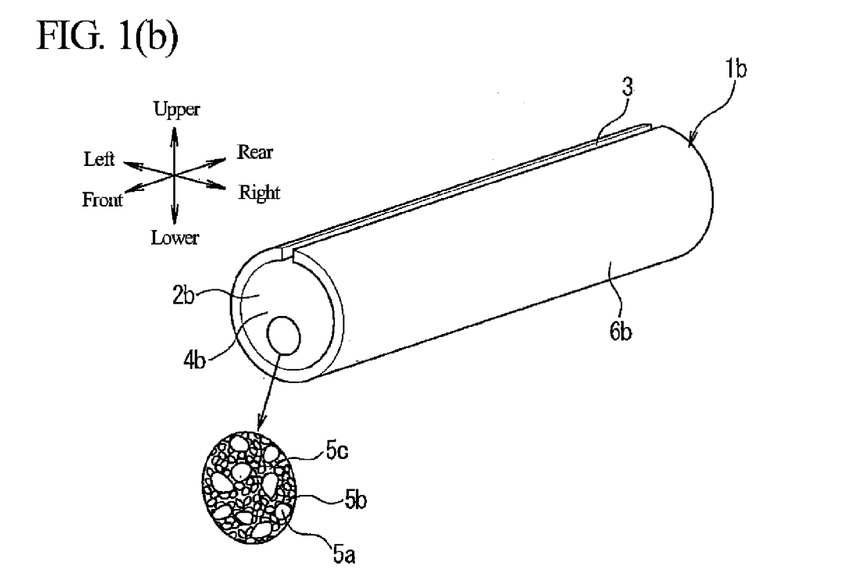
FIG. 1(b) is a perspective view of a split sleeve for the sleeve for optical communication and a partially enlarged view showing a surface state of an inner peripheral surface of the split sleeve of the present invention.

An embodiment of a sleeve for optical communication according to the present invention will be specifically described using the drawings. In this specification, the words of "front", "rear", "upper", "lower", "left", and "right" represent directions shown in FIG. 1.

Although the sleeve for optical communication according to the embodiment will be described while exemplifying two types of sleeves, that is, a precision sleeve 1a shown in FIG. 1(a) and a split sleeve 1b shown in FIG. 1(b), the embodiment is not limited thereto, and sleeves having other configurations may be used. In order to obtain the sleeve for optical communication according to the present invention, a powder of a ceramics material is processed by a press-forming to form a preform, and a cold isostatic press is conducted to the preform to form a formed body, the formed body is degreased and fired, and, if necessary, a length dimension, an outer diameter dimension, and the like of the fired formed body are processed or adjusted.

The sleeve for optical communication is formed of various composite ceramics such as ceramics i.e., zirconia, alumina, mullite, silicon nitride, silicon carbide, and aluminum nitride, glass ceramics such as $SiO_2$—$Al_2O_3$-based or $SiO_2$—$B_2O_3$-based crystallized glass, dispersed zirconia-containing alumina ceramics mainly composed of $Al_2O_3$ and mixed with $ZrO_2$, dispersed zirconia-containing alumina ceramics in which very fine zirconia grains having a nano-level grain diameter are dispersed in an alumina crystal grain boundary, and grain boundary strength is drastically enhanced, and ceramics mainly composed of $Al_2O_3$ and mixed with $Al_2B_2O_9$. As the composite ceramics or the like, partially stabilized zirconia more excellent particularly in weatherability, bending strength, and the like are more preferable.

The partially stabilized zirconia is mainly composed of $ZrO_2$, and contains $Y_2O_3$, $MgO$, $CeO_2$, $Dy_2O_3$, $CaO$, and the like as stabilizers. Moreover, the partially stabilized zirconia is excellent in weatherability, has high toughness or strength, and is easily polished. Thus, by virtue of the use of the partially stabilized zirconia, a high accuracy sleeve for optical communication used for a long period of time can be obtained.

The precision sleeve 1a shown in FIG. 1(a) is formed into a hollow cylindrical shape having a through-hole 2a into which a ferrule is inserted in an axial length direction. An inner diameter of the through-hole 2a is slightly larger than an outer diameter of the ferrule inserted through the through-hole 2a, and the through-hole 2a is thus formed so that the ferrule is easily inserted therein, and, in addition, the inserted ferrule is prevented from rattling.

The split sleeve 1b shown in FIG. 1(b) is formed into a hollow cylindrical shape having a through-hole 2b into which the ferrule is inserted in an axial length direction, and a slit 3 is formed along the axial length direction in a portion of the through-hole 2b so as to be connected from an inner peripheral surface of the through-hole 2b to an outer peripheral surface 6b of the split sleeve 1b. The inner diameter of the through-hole 2b is slightly smaller than the outer diameter of the ferrule inserted through the through-hole 2b, and the through-hole 2b is formed so that the split sleeve 1b is elastically deformed in a direction in which the split sleeve 1b is slightly expanded when the ferrule is inserted, whereby the ferrule inserted into the through-hole can be firmly held.

The precision sleeve 1a and the split sleeve 1b for the sleeve for optical communication of the present embodiment are formed so that the inner peripheral surfaces 4a and 4b of the through-holes 2a and 2b are fired surfaces. Here, the "fired surface" is referred to as a surface formed when a formed body to be described later is fired. Namely, as shown in FIGS. 1(a) and 1(b), in the precision sleeve 1a and the split sleeve 1b according to the present embodiment, when portions of the inner peripheral surfaces 4a and 4b are shown with enlargement, a plurality of crystal grains 5a and 5b having different grain sizes appear on the inner peripheral surfaces 4a and 4b. Further, a crystal grain group consisting of a large number of crystal grains including the crystal grains 5a and 5b appears. Furthermore, a crystal grain boundary Sc is formed between the crystal grains 5a and 5b adjacent to each other. In the crystal grains 5a and 5b, the degree of growth, that is, the grain diameter of the crystal grains 5a and 5b is different depending on, for example, firing temperature and time in a firing process in the formation of the sleeve for optical communication. And, for example when the firing temperature is low, or when the firing time is short, the grain sizes of the crystal grains 5a and 5b often become relatively small in large number thereof; otherwise, for example, when the firing temperature is high, or when the firing time is long, the grain sizes of the crystal grains 5a and 5b become relatively large.

At this time, each surface roughness $R_a$ of the inner peripheral surfaces 4a and 4b is 0.08 to 0.20 μm, preferably 0.08 to 0.15 μm, more preferably 0.08 to 0.12 μm. When the surface roughness is reduced, it becomes easy to obtain a sleeve which the pull-out force for a ferrule and the connection loss between the ferrules satisfy the conditions and requirements of the standards generally used in the technical field of optical communication. A tolerance of inner diameters of the inner peripheral surfaces 4a and 4b is ±2 to 10 μm, preferably ±2 to 8 μm, more preferably ±2 to 5 μm. When the tolerance of the inner diameters of the inner peripheral surfaces 4a and 4b is ±2 to 5 μm, it becomes easier to obtain the sleeve which the pull-out force for a ferrule and the connection loss between the ferrules satisfy the conditions and requirements of the standards generally used in the technical field of optical communication.

It is preferable that the inner diameters of the precision sleeve 1a and the split sleeve 1b are designed so that force applied to the ferrule when the ferrule inserted into each sleeve is press-fitted or pulled out (the force is hereinafter referred to as "pull-out force") is in the range of from 1.5 to 6 N, preferably in the range of from 2 to 6 N, more preferably in the range of from 2 to 4 N. When the pull-out force in that range is applied to the ferrule, the ferrule can be easily inserted. Further, when the inner diameter of each sleeve is designed so that the pull-out force is in that range, the inserted ferrule can be reliably held.

In outer peripheral surfaces 6a and 6b of the precision sleeve 1a and the split sleeve 1b, the surface roughness $R_a$ is not more than 0.3 μm, preferably not more than 0.2 μm, more preferably not more than 0.1 μm. Although the outer peripheral surfaces 6a and 6b may be subjected to finishing processing such as polishing processing, they may be fired surfaces as long as the above conditions of the surface roughness $R_a$ can be met. When the outer peripheral surfaces 6a and 6b are fired surfaces, finishing processing to be described later is not required to be performed, and therefore, it is possible to significantly reduce the manufacturing cost and significantly enhance manufacturing efficiency.

Hereinabove, although an example of the configuration of the sleeve for optical communication according to the embodiment of the present invention has been described, the sleeve for optical communication according to the invention is not limited to the example and may be optionally changed without departing from the scope of the invention.

Next, a method of manufacturing a sleeve for optical communication according to the present embodiment will be described. As an example, a case in which ceramics made of zirconia is used as a material of the sleeve for optical communication will be described.

Figure 2:
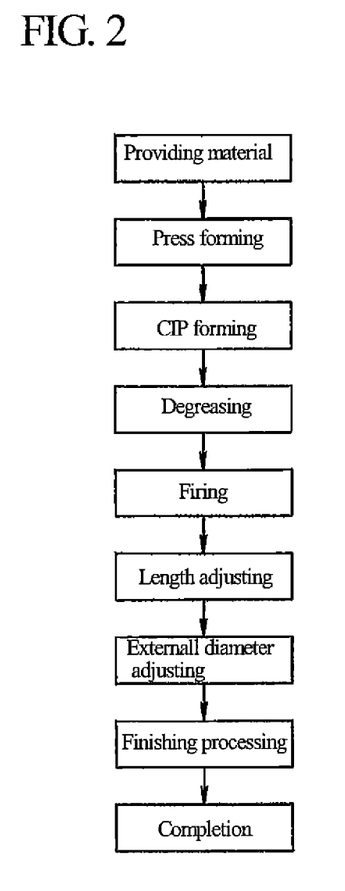
FIG. 2 is a flowchart showing processes for manufacturing the sleeve for optical communication thereof.

As shown in FIG. 2, in the manufacturing of the sleeve for optical communication, a material for forming the sleeve for optical communication is provided. In the present embodiment, as a material, partially stabilized zirconia mainly composed of $ZrO_2$, containing $Y_2O_3$, MgO, $CeO_2$, $Dy_2O_3$, CaO, and the like as stabilizers, and added with a binder is provided. Since the partially stabilized zirconia is excellent in processability and, for example, is easily polished, the sleeve for optical communication can be easily formed.

Figure 3A:
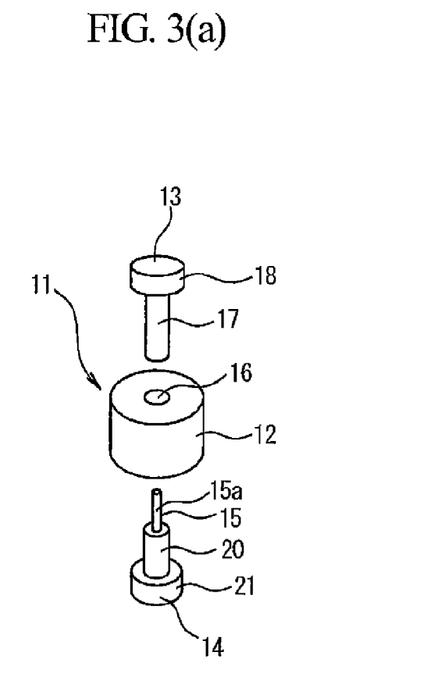
FIG. 3(a) is a schematic view for explaining an example of a form used in a press forming.

Next, a ceramics raw material M is treated by the press-forming to form a preform M1. Press forming step is performed using a die tool 11 shown in FIG. 3. The die tool 11 used in the press forming is constituted of a middle die 12, an upper die 13, a lower die 14, and a core 15. The middle die 12 is formed into a substantially columnar shape in the present embodiment, and a through-hole 16 is opened and formed at a central portion of the middle die 12. The through-hole 16 is formed to have a circular shape in plan view of the middle die 12. The through-hole 16 is formed so that the inner diameter of the through-hole 16 is substantially the same as outer diameters of the upper die 13 and the lower die 14, or is slightly larger than the outer diameter of the upper die 13 and the lower die 14, and the upper die 13 and the lower die 14 can be easily inserted into the through-hole 16.

The upper die 13 is inserted from above in the through-hole 16 of the middle die 12. The upper die 13 has an upper insertion portion 17, formed to have an outer diameter substantially the same as or slightly smaller than the inner diameter of the through-hole 16, and an upper large diameter portion 18 formed to have an outer diameter larger than the outer diameter of the upper insertion portion 17. The upper insertion portion 17 is provided with an upper insertion hole 19 into which a front end portion 15a of the core 15 is inserted. The lower die 14 is inserted from beneath in the through-hole 16 of the middle die 12. The lower die 14 has a lower insertion portion 20, formed to have an outer diameter substantially the same as or slightly smaller than the inner diameter of the through-hole 16, and a lower large diameter portion 21 formed to have an outer diameter larger than the outer diameter of the lower insertion portion 20. The lower die 14 has an insertion hole 22 which penetrates through in a longitudinal direction and through which the core 15 is inserted. The insertion hole 22 is formed to have an inner diameter substantially the same as or slightly larger than the outer diameter of the core 15 and is formed so that the core 15 can be inserted through the insertion hole 22. The core 15 is a bar-like member formed to have a diameter substantially the same as or slightly smaller than the inner diameter of the insertion hole 19 of the upper die 13 and the inner diameter of the insertion hole 22 of the lower die 14 and is formed to have a length that allows the front end portion 15a to be inserted into the upper insertion hole 19.

Figure 3B:
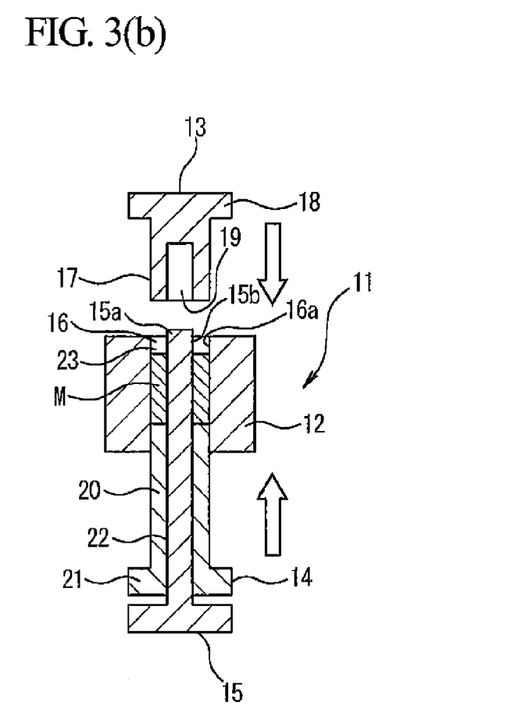
FIG. 3(b) is a schematic view for explaining a state in which a ceramics raw material is formed by the press-forming to form a preform.

When a preform is formed by press forming, the lower die 14 is inserted from beneath in the through-hole 16 of the middle die 12, and the core 15 is inserted through the insertion hole 22 of the lower die 14. At this time, in the through-hole 16, a space 23 is formed between the inner peripheral surface 16a of the through-hole 16 and the outer peripheral surface 15b of the core 15. The ceramics raw material M is entered, i.e. filled into the space 23. Then, the upper die 13 is inserted into the through-hole 16, the ceramics raw material M entered or filled into the space 23 is pressed and hardened by application of pressure, whereby a preform M1 is obtained.

In the method of manufacturing a sleeve for optical communication according to the present embodiment, since the preform M1 is obtained by press forming, the binder contained in the ceramics raw material M can be significantly reduced. Thus, forming density of the ceramics raw material M in the preform M1 can be relatively uniformed. Further, since the preform M1 can be obtained by press forming, large pressure is easily applied when the ceramics raw material M is pressed and hardened, so that the preform M1 can be firmly pressed and hardened.

Figure 4A:
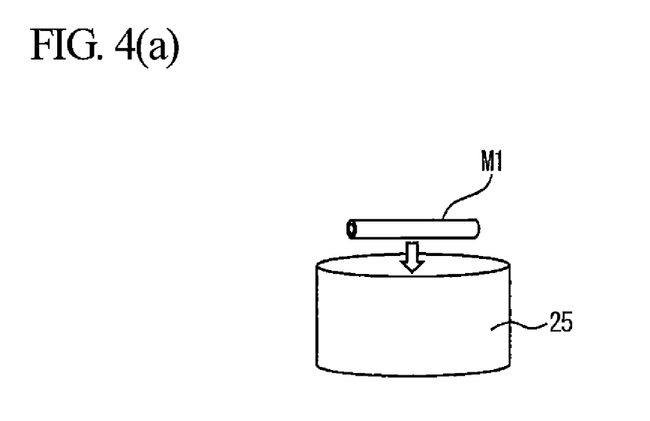
FIG. 4(a) is a schematic view for explaining a state in which the preform is put into a soft container.

Next, a cold isostatic pressing is given for the preform M1 to obtain the formed body. The cold isostatic press is a method of putting the preform M1 into a flexible container such as a rubber bag and applying a hydrostatic pressure to the preform M1 in a liquid medium such as water or oil to form the formed body and is also called a wet process. In the present embodiment, as shown in FIG. 4(a), first, the preform M1 formed by press forming is put into a flexible container 25 formed into a bag shape. It is preferable that the flexible container 25 is formed of a flexible material easily deformed by force applied from outside of the flexible container 25, and specifically, it is preferable to use a flexible container formed of rubber, vinyl, nylon, or the like.

Figure 4B:
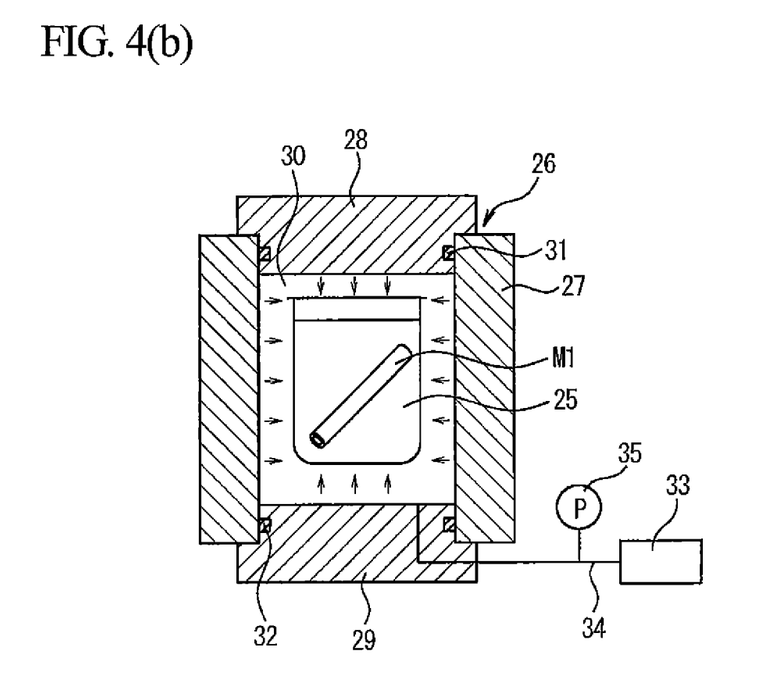
FIG. 4(b) is a schematic view for explaining a state in which a cold isostatic pressing is conducted to the preform put in the soft container.

Next, the flexible container 25 sealed while the preform M1 is put therein is put in a pressurized container 26. As shown in FIG. 4(b), the pressurized container 26 is provided with a side wall 27, an upper lid 28, and a lower lid 29. In the pressurized container 26, a pressurized space 30 surrounded by the side wall 27, the upper lid 28, and the lower lid 29 is formed. In the upper lid 28, a sealing member 31 such as an O-ring is provided at a portion mated to an inner peripheral surface of the side wall 27 and is configured so that it can seal the upper lid 28 and the side wall 27. In the lower lid 29, a sealing member 32 such as an O-ring is provided at a portion mated to the inner peripheral surface of the side wall 27 and is configured so that it can seal the lower lid 29 and the side wall 27. Further, a piping 34 which is connected to a pressurizing pump 33 at an end is connected to the lower lid 29 at the other end thereof, and the lower lid 29 is provided with a flow passage through which liquid flows between the pressuring pump and the pressurized space 30 via the piping 34. Note that, reference numeral 35 indicates a pressure gauge showing pressure in the pressurized space 30. And the pressurized space 30 is formed to have a size that allows the flexible container 25 and a liquid such as water to be put therein.

In the pressurized space 30, the flexible container 25 is put therein, and a liquid such as water is injected therein; thereafter, the upper lid 28 is attached to the side wall 27, and the pressurized space 30 is hermetically sealed. Next, the pressurizing pump 33 is driven to pressurize the inside of the pressurized space 30 at a pressure of 130 to 210 MPa. The pressure at this time is preferably 150 to 200 MPa, more preferably 170 to 190 MPa. In the cold isostatic press, the pressurized space 30 is pressurized at this pressure for a predetermined time, the pressurization by the pressurizing pump 33 is thereafter stopped, and the upper lid 28 is detached to take out the flexible container 25 from the inside of the pressurized space 30. Next, the formed body obtained by giving the preform M1 through a cold isostatic press is taken out from the flexible container 25. Although forming density of the ceramics raw material M in the preform M1 is relatively uniform because press forming is performed using the ceramics raw material M with little binder, forming density distribution of the ceramics raw material M in the preform M1 slightly varies. This is because in the press forming, force is applied to the ceramics raw material M only from a certain specific direction.

In the method of manufacturing a sleeve for optical communication according to the present embodiment, cold isostatic press is performed after press forming, so that force can be applied to the preform M1, formed in the press forming, from all directions, whereby the variation of the forming density distribution of the ceramics raw material M in the preform M1 can be eliminated. Namely, while a portion in which the forming density of the ceramics raw material M in the preform M1 is sparse is easily made dense by the force applied in the cold isostatic pressing, a portion in which the forming density of the ceramics raw material M in the preform M1 is dense is hardly affected by the force applied in the cold isostatic pressing, and the original forming density is maintained. Thus, a difference of the forming density between the portion in which the forming density tends to be sparse and the portion in which the forming density is dense is significantly reduced, and the forming density distribution of the ceramics material as the entire formed body can be substantially uniformed, so that the variation in the forming density can be eliminated. Namely, when the treatment of the cold isostatic press is performed after press forming, each portion of the preform M1 can be pressed and hardened by uniform strong force, so that the forming density of the ceramics raw material M in each portion of the preform can be further uniformed. In the cold isostatic press, such a formed body can be obtained from the preform M1.

Next, the formed body is degreased. The degreasing is performed for the purpose of removing a binder contained in the formed body, and after the formed body is put in a degreasing furnace, the formed body is heated at a temperature of 400 to 500° C. for a predetermined time, whereby the degreasing is performed. When the formed body is degreased, the binder in the formed body is eliminated, and a portion where the binder exists becomes a void. However, according to the method of manufacturing a sleeve for optical communication according to the present embodiment, since the preform M1 is formed by press forming, the amount of the binder contained in the ceramics raw material M can be reduced. Thus, by virtue of the degreasing, the amount of voids existing in the formed body can be significantly reduced, so that distortion can be prevented from occurring when the sleeve for optical communication is formed from the formed body.

Next, the degreased formed body is taken out from the degreasing furnace and then fired. In the firing, the degreased formed body is put in a firing furnace, then heated for a predetermined time at a temperature of 1300 to 1500° C. higher than the degreasing temperature, and thereafter cooled by an air cooling method, a water cooling method, or the like to obtain a fired formed body. In the method of manufacturing the sleeve for optical communication according to the present embodiment, since the amount of the binder contained in the ceramics raw material M can be significantly reduced, the amount of voids formed in the formed body in the degreasing can be reduced. Further, in the method of manufacturing a sleeve for optical communication according to the present embodiment, cold isostatic pressing is performed after press forming, whereby the forming density distribution of the ceramics raw material M in the formed body is uniformed, and the formation of voids or the like between the ceramics raw materials M can be significantly reduced. Thus, distortion occurring in the formed body upon cooling after firing and variation in the inner diameter dimension do not occur. In the present embodiment, the formed body is degreased in a degreasing furnace to be taken out from the degreasing furnace and, thus, to be put in a firing furnace, whereby the formed body is fired; however, the temperature of the firing furnace is adjusted, whereby degreasing and firing may be performed in the firing furnace.

In the subsequent length processing, the dimension in the longitudinal direction of the fired formed body is adjusted to be a predetermined length in the longitudinal direction of the sleeve for optical communication. The length adjusting may not be performed when the dimension in the longitudinal direction of the fired formed body is a predetermined dimension.

In the subsequent outer diameter processing, when an outer diameter of the fired formed body is larger than a predetermined outer diameter of the sleeve for optical communication, or when the outer diameter of the fired formed body varies in the longitudinal direction, the outer diameter of the fired formed body is processed to be substantially the same as the predetermined outer diameter of the sleeve for optical communication. Here, "substantially the same diameter" does not mean that the outer diameter of the fired formed body is completely same as the predetermined outer diameter of the sleeve for optical communication but means that the outer diameter of the fired formed body is within a predetermined allowable error range with respect to the predetermined outer diameter of the sleeve for optical communication.

In the finishing processing, an end surface in the longitudinal direction of the fired formed body is processed. In the present embodiment, various processings such as processing for chamfering an end of the end surface, curved surface machining, and deburring are performed. When the sleeve for optical communication to be manufactured is the split sleeve 1b, the slit 3 is formed by the finishing processing. The finishing processing may not be performed when various processings such as chamfering processing, curved surface machining, and deburring are not required for the fired formed body and when the slit 3 may not be formed because the sleeve for optical communication to be manufactured is the precision sleeve 1a.

The sleeve for optical communication formed through the above processes is formed so that the inner peripheral surfaces of the through-holes 2a and 2b are fired surfaces.

Next, the operational advantages of the sleeve for optical communication according to the present embodiment will be described. Since the sleeve for optical communication according to the present embodiment is formed so that the inner peripheral surfaces of the through-holes 2a and 2b are fired surfaces, a sleeve for optical communication in which the pull-out force for a ferrule and the connection loss between the ferrules satisfy the conditions and requirements of the standards in the technical field of optical communication can be provided at very low cost. Specifically, it is possible to provide a sleeve for optical communication, which satisfies such conditions of the standards in the technical field of optical communication that the connection loss between optical fibers connected inside the sleeve for optical communication is not more than 0.3 dB and that the pull-out force applied when the optical fiber is pulled out from the sleeve for optical communication is 1.5 to 6 N. According to the sleeve for optical communication of the present embodiment, even when the inner peripheral surfaces of the through-holes 2a and 2b are fired surfaces, the optical fiber can be connected so that the pull-out force for the ferrule and the connection loss between the ferrules satisfy the conditions of the standards in the technical field of optical communication.

In the sleeve for optical communication according to the present embodiment, the surface roughness $R_a$ of the inner peripheral surface is set to a value in the above range, or/and the tolerance of the inner diameter of the through-hole is set to a value in the above range, whereby it is possible to provide an optical connector having such characteristics that the pull-out force for the ferrule and the connection loss between the ferrules are determined as the conditions of the standards in the technical field of optical communication.

In the method of manufacturing a sleeve for optical communication according to the present embodiment, the powder of the ceramics raw material M is press-formed to form the preform M1, and the preform M1 is compression-formed by cold isostatic pressing to form the formed body; therefore, the forming density of the ceramics raw material M in the preform M1 can be uniformed in the press-forming, and occurrence of distortion of the formed body after degreasing and firing can be reliably prevented. Accordingly, in the method of manufacturing a sleeve for optical communication according to the present embodiment, there is no variation in the hole diameters of the through-holes 2a and 2b and change of the hole shape due to deformation. Thus, the number of the manufacturing processes can be significantly reduced, and the sleeve for optical communication can be manufactured at very low cost. In the method of manufacturing a sleeve for optical communication according to the present embodiment, although the example in which the outer diameter processing is performed after the length processing has been described, the present invention is not limited to the example, and the length adjusting may be performed after the outer diameter processing.

EXAMPLES

Hereinafter, although the present invention will be described in detail using examples, the invention is not limited to the examples.

Example

Manufacturing of Sleeve for Optical Communication

In this example, a ceramics raw material mainly composed of $ZrO_2$, containing $Y_2O_3$ and $Al_2O_3$ as stabilizers, and added with a binder was provided. A lower die was inserted from beneath a through-hole formed in a middle die, and the previously provided ceramics raw material was put in a space of a form in which a core was inserted through an insertion hole of the lower die. Subsequently, an upper die was inserted from above the through-hole of the middle die, and the ceramics raw material was pressed and hardened by applying downward force from above the upper die and upward force from beneath the lower die, using a press apparatus, whereby a preform was formed.

Next, the preform was put in a bag-like flexible container having a size of 550 mm in the vertical direction and 25 mm in the horizontal direction. As the flexible container, an easily deformed flexible container formed by using a nylon packaging bag was used. Subsequently, the flexible bag containing the preform was entered into a pressurized space into which water in a pressurized container of a cold isostatic pressing machine was injected, and after that, an upper lid was closed to hermetically seal the pressurized container.

Next, a pressurizing pump of the cold isostatic press machine was driven to increase water pressure in the pressurized container to 200 MPa, and the water pressure was maintained for two minutes. After that, the water pressure in the pressurized container was decreased, and the upper lid was opened to take out the flexible container in the pressurized space. Then, after the cold isostatic press, the formed body was taken out from the flexible container.

Next, after the formed body was put into the degreasing furnace, the temperature of the degreasing furnace was increased to 400° C., and the formed body was degreased. Subsequently, after the temperature of the degreasing furnace was decreased, the degreased formed body was taken out from the degreasing furnace.

Next, the degreased formed body was put into the firing furnace, and a temperature of the firing furnace was increased to 1350° C., and the formed body was fired. Subsequently, after the temperature of the firing furnace was decreased, the fired formed body was taken out from the firing furnace. An inner diameter of the fired formed body was 2.49 mm.

Next, the fired formed body was processed to have a length dimension of 11.4 mm and an outer diameter of 3.2 mm by using a grinding machine or the like, and chamfering processing for an end of a through-hole and processing for slit formation were performed to obtain a sleeve for optical communication of the example.

[Measurement of Surface Roughness $R_a$ of Inner Peripheral Surface of Sleeve for Optical Communication]

The surface roughness $R_a$ of an inner peripheral surface of the sleeve for optical communication was measured by using a surface roughness measure. As a result of the measurement, the surface roughness $R_a$ in the example was 0.0989 μm in average.

[Measurement of Connection Loss]

A first optical fiber to which a ferrule was attached at the front end was inserted from one end side of the sleeve for optical communication according to the example, and a second optical fiber to which a ferrule was attached at the front end was inserted from the other end side of the sleeve for optical communication. Inside the sleeve for optical communication, respective end surfaces of the first optical fiber and the second optical fiber were butted against each other to be in contact with each other. Subsequently, light was made to enter the first optical fiber, whereby an amount of light emitted from the second optical fiber was measured. Then, the connection loss was calculated from the amount of the incident light and the amount of the emitting light. As a result of the measurement, the calculation result of the connection loss obtained when the sleeve for optical communication according to the example was used was 0.19 dB in average.

[Measurement of Pull-Out Force]

The magnitude of the pull-out force applied when the first optical fiber and the second optical fiber inserted into the sleeve for optical communication according to the example was pulled out from the sleeve for optical communication was measured. As a result of the measurement, the magnitude of the pull-out force in the sleeve for optical communication according to the example was 2.1 N in average.

The measurement results of the surface roughness $R_a$, the connection loss, and the magnitude of the pull-out force measured for the sleeve for optical communication according to the example are shown in Table 1.

Comparative Example

Manufacturing of Sleeve for Optical Communication

In the comparative example, a ceramics raw material similar to that in the above example was provided. A lower die was inserted from beneath a through-hole formed in a middle die, and the previously provided ceramics raw material was entered into a space of a form in which a core was inserted through an insertion hole of the lower die. Subsequently, an upper die was inserted from above the through-hole of the middle die, and the ceramics raw material was pressed and hardened by applying downward force from above the upper die and upward force from beneath the lower die, using a press apparatus, whereby a preform was formed. A pressure applied to the ceramics raw material at this time was 2 ton/cm$^2$.

Next, after the formed body was put into the degreasing furnace, the temperature of the degreasing furnace was increased to 400° C., and the formed body was degreased. Subsequently, after the temperature of the degreasing furnace was decreased, the degreased formed body was taken out from the degreasing furnace.

Next, the degreased formed body was put into a firing furnace, and a temperature of the firing furnace was increased to 1350° C., and the formed body was fired. Subsequently, after the temperature of the firing furnace was decreased, the fired formed body was taken out from the firing furnace.

Next, the fired formed body was processed to have a length dimension of 11.4 mm by using a grinding machine or the like. Since an inner diameter of the fired formed body varied, the formed body was processed to have an inner diameter of 2.49 mm. Further, the fired formed body was processed to have an outer diameter of 3.2 mm. After that, chamfering processing for an end of a through-hole and processing for slit formation were performed to obtain a sleeve for optical communication of the comparative example. Since the inner peripheral surface of the sleeve for optical communication was subjected to the inner-diameter processing, the inner peripheral surface was a ground surface on which crystal grains and a crystal grain boundary are not exposed.

[Measurement of Surface Roughness $R_a$ of Inner Peripheral Surface of Sleeve for Optical Communication]

The surface roughness $R_a$ of the inner peripheral surface of the sleeve for optical communication was measured by a method similar to that in the example. As a result of the measurement, the surface roughness $R_a$ in the comparative example was 0.0213 μm in average.

[Measurement of Connection Loss]

By a method similar to that in the example, the connection loss between a first optical fiber and a second optical fiber occurring when the sleeve for optical communication of the comparative example was used was measured. As a result of the measurement, the calculation result of the connection loss obtained when the sleeve for optical communication according to the comparative example was used was 0.12 dB in average.

[Measurement of Pull-Out Force]

The pull-out force in the comparative example was measured by a method similar to that in the example. As a result of the measurement, the magnitude of the pull-out force in the sleeve for optical communication according to the comparative example was 2.8 N in average.

The measurement results of the surface roughness $R_a$, the connection loss, and the magnitude of the pull-out force measured for the sleeve for optical communication according to the comparative example are shown in Table 1.

TABLE 1

|  | Surface roughness Ra (μm) | Connection loss (dB) | Pull-out force (N) |
| --- | --- | --- | --- |
| Example | 0.0989 | 0.19 | 2.1 |
| Comparative example | 0.0213 | 0.12 | 2.8 |

From the above results, in the sleeve for optical communication according to the example and the sleeve for optical communication according to the comparative example, it was found that the pull-out force applied to the ferrule was 1.5 to 6 N, and the connection loss between the ferrules butted against each other in the sleeve for optical communication was not more than 0.3 dB. In the sleeve for optical communication according to the example, since there is no treatment of the inner-diameter processing step, the number of manufacturing processes or steps in the formation of the sleeve for optical communication concerned is smaller or fewer compared to the comparative example, and the sleeve for optical communication according to the example can be manufactured at lower cost than the sleeve according to the comparative example.

REFERENCE SIGNS LIST 1a precision sleeve
1b split sleeve
2a, 2b through-hole
3 slit
4a, 4b inner peripheral surface
5a, 5b crystal grain
5c crystal grain boundary
6a, 6b outer peripheral surface
11 die tool
12 middle die
13 upper die
14 lower die
15 core
16 through-hole
23 space
25 flexible container
26 pressurized container
27 side wall
28 upper lid 29 lower lid
30 pressurized space
33 pressurizing pump
M ceramics raw material
M1 preform

The invention claimed is:

1. A method of manufacturing a sleeve for optical communication apparatus, comprising the steps of:

forming a cylindrical sleeve having an inner peripheral surface by press-forming a powder of a ceramics raw materials added binder therein;

pressing the cylindrical sleeve to 200 MPa and a water pressure being maintained for two minutes by a cold isostatic pressing apparatus to eliminate variation of a density distribution of the ceramics raw materials in the cylindrically formed sleeve;

degreasing the cold isostatic pressed cylindrical sleeve by application of a firing treatment at a temperature of 400 to 500° C. for a predetermined time to obtain a cylindrical sleeve decreased and to eliminate binders therein where a portion where the binders existed between the ceramic raw materials becomes a void; and heating and firing the degreased cylindrical sleeve subsequently conducted with firing treatment at a temperature of 1300 to 1500° C. within a predetermined time to reduce a surface roughness $R_a$ of the inner peripheral surface within 0.08 to 0.20 μm and to have different grain sizes appeared thereon and to form a crystal grain boundary between the crystal grains to each other on an inner peripheral surface to possess a pull-out force satisfied with a value provided in standards in use, to reduce a connection loss in use, and to prevent distortion of the cylindrical sleeve after the degreasing and firing treatments.

2. The method of manufacturing a sleeve for optical communication according to claim 1, wherein the fired formed body is processed to have a predetermined length.

3. The method of manufacturing a sleeve for optical communication according to claim 1, wherein an outer periphery of the fired formed body is processed.

4. The method of manufacturing a sleeve for optical communication according to claim 1, wherein finishing processing is performed after cooling the fired formed body.

* * * * *